United States Patent
Guillarme et al.

(10) Patent No.: US 7,405,495 B2
(45) Date of Patent: Jul. 29, 2008

(54) MULTICELLULAR DC/DC VOLTAGE CONVERTER WITH PROTECTION SWITCHES

(75) Inventors: Nicolas Guillarme, Meriel (FR); Bruno Condamin, Epinay-sur-Seine (FR)

(73) Assignee: Johnson Controls Automotive Electronics, Osny (FR)

( * ) Notice: Subject to any disclaimer, the term of this patent is extended or adjusted under 35 U.S.C. 154(b) by 286 days.

(21) Appl. No.: 10/501,627

(22) PCT Filed: Jan. 22, 2003

(86) PCT No.: PCT/FR03/00209

§ 371 (c)(1),
(2), (4) Date: Jul. 15, 2004

(87) PCT Pub. No.: WO03/063327

PCT Pub. Date: Jul. 31, 2003

(65) Prior Publication Data

US 2005/0083715 A1    Apr. 21, 2005

(30) Foreign Application Priority Data

Jan. 22, 2002  (FR) ................... 02 00750
Jan. 22, 2002  (FR) ................... 02 00751

(51) Int. Cl.
*H02J 1/00*    (2006.01)

(52) U.S. Cl. ............................ 307/82; 307/44; 323/285
(58) Field of Classification Search .................. 307/44, 307/82; 323/285
See application file for complete search history.

(56) References Cited

U.S. PATENT DOCUMENTS

| 4,412,277 | A | * | 10/1983 | Mitchell | 363/81 |
| 5,155,648 | A | * | 10/1992 | Gauthier | 361/58 |
| 5,598,041 | A | * | 1/1997 | Willis | 307/43 |
| 5,659,208 | A | * | 8/1997 | Kimble et al. | 307/82 |
| 5,808,453 | A | | 9/1998 | Lee et al. | 323/224 |
| 6,160,386 | A | | 12/2000 | Hemena et al. | 323/272 |
| 6,275,958 | B1 | | 8/2001 | Carpenter et al. | 714/48 |
| 6,317,345 | B1 | | 11/2001 | Hayward et al. | 363/65 |
| 6,600,238 | B1 | * | 7/2003 | Emberty et al. | 307/85 |

* cited by examiner

*Primary Examiner*—Michael J Sherry
*Assistant Examiner*—Hal I Kaplan
(74) *Attorney, Agent, or Firm*—Foley & Lardner LLP

(57) ABSTRACT

A DC/DC voltage converter between a high-voltage electrical network and a low-voltage electrical network comprises a plurality of cells connected in parallel. Each cell comprises a chopper DC/DC converter and a single protection transistor connected in a high-voltage portion of the converter thereby enabling any of the cells to be taken out of service independently of the other cells while minimizing power consumption in normal operation.

3 Claims, 8 Drawing Sheets

MULTICELLULAR DC/DC VOLTAGE CONVERTER WITH PROTECTION SWITCHES

CROSS REFERENCE TO RELATED APPLICATIONS

This application is a National Stage of Application PCT/FR03/00209, filed Jan. 22, 2003, which claims priority to French patent application 02 00750 filed Jan. 22, 2002 and French patent application FR 02 00751 filed Jan. 22, 2002, the disclosures of all three being incorporated herein by reference in their entirety.

FIELD

The present application relates to a voltage converter and finds applications, in particular, in the automotive field.

The application relates more particularly to a direct current/direct current (DC/DC) voltage converter that is multicellular, i.e. comprising a plurality of cells forming a corresponding number of respective individual converters connected in parallel with one another. In particular, each cell may be a chopper DC/DC converter which may present the particular feature of being non-isolated.

BACKGROUND

Such a chopper converter may be a controlled two-port electrical circuit comprising a first pair of positive and negative terminals and a second pair of positive and negative terminals. The first and second negative terminals may be connected together by a first determined circuit branch. Similarly, the first and second positive terminals may be connected together by a second determined circuit branch which includes an inductor forming an energy reservoir. The converter may further comprise chopper means comprising at least one controlled switch which is switched OFF and ON with a determined duty ratio under the control of a management unit.

Such a circuit may be capable of delivering direct and/or quasi-direct electric current between the first pair of positive and negative terminals at a determined voltage, referred to as the "output" voltage, when a determined voltage, referred to as the "input" voltage, is applied between the second pair of positive and negative terminals, or vice versa.

The converter is said to be non-isolated in the sense that it comprises the first and second circuit branches respectively interconnecting the first and second negative terminals and the first and second positive terminals. Such a converter is contrasted with an isolated converter in which the first pair of terminals is isolated from the second pair of terminals.

In order to reduce the size of the components making up the converter, while delivering sufficient power to feed various items of equipment, it is known, in particular from document U.S. Pat. No. 6,275,958, to implement a multicellular converter comprising a series of cells connected in parallel. When a cell is faulty, it is also known from that document to isolate the faulty cell by means of two protection switches formed by metal oxide semiconductor (MOS) transistors disposed one on a high-voltage network side and the other on a low-voltage network side.

Those transistors operate as controlled switches which are ON in normal operation and which are OFF when malfunction is detected.

It follows that in normal operation, the components that are dedicated to the protection function give rise to static consumption of power which, depending on circumstances, can lie in the range 0.5% to 2.0% of the static consumption of the circuit as a whole.

Furthermore, the presence of those protection components leads to an increase in the size of the electrical circuit, to a lengthening and greater complexity in the manufacturing method, and finally to a significant increase in the cost of the circuit.

SUMMARY

According to some embodiments of a multicellular voltage converter has a fault mode of operation in which a determined cell can be taken out of service independently of the other cells when the cell suffers a malfunction, while minimizing power consumption in normal operation.

One embodiment proposes a DC/DC voltage converter comprising:

a first positive terminal and a first negative terminal for connection respectively to two terminals of a high-voltage electrical network;

a second positive terminal and a second negative terminal for connection respectively to two terminals of a low-voltage electrical network; and n cells connected in parallel, where n is an integer greater than unity, disposed between said first positive and negative terminals and between said second positive and negative terminals, each cell comprising a chopper DC/DC converter, each having a first circuit branch interconnecting said first and second negative terminals, a second circuit branch including an inductor and interconnecting said first and second positive terminals, chopper means comprising at least one chopper switch, and a management unit adapted to control OFF and ON switching of the chopper switch with a determined duty ratio;

in which each cell further comprises a single protection transistor disposed in said second circuit branch and associated with a protection management unit for taking said cell out of service independently of the other cells.

Contrary to the conventional wisdom of document U.S. Pat. No. 6,275,958, only one protection transistor suffices to enable the corresponding cell to be isolated, and the cell is put into operation by controlling this single transistor in order to switch it ON, so that consumption is smaller.

In one embodiment, the single protection transistor of each cell is connected in the high-voltage portion of the converter. Because of the high voltage, the holding current when the transistor is in the ON position b may be smaller, so consumption may be further minimized.

n cells connected in parallel, where n is an integer greater than unity, disposed between said first positive and negative terminals and between the second positive and negative terminals, each cell comprising a chopper DC/DC converter, each having a first circuit branch interconnecting the first and second negative terminals, a second circuit branch including an inductor and interconnecting said first and second positive terminals, chopper means comprising at least one chopper switch, and a management unit adapted to control OFF and ON switching of the chopper switch with a determined duty ratio;

in which each cell further comprises a single protection transistor disposed in the second circuit branch and associated with a protection management unit for taking said cell out of service independently of the other cells.

BRIEF DESCRIPTION OF THE DRAWINGS

Other features and advantages appear from the following description of non-limiting embodiments given with reference to the accompanying drawings, in which.

DETAILED DESCRIPTION OF EXEMPLARY EMBODIMENTS

In the figures, in order to show clearly the orientation of the transistors used, the letters D and S designate respectively the drain and the source of each transistor, in correspondence with the orientation specified in the description for that transistor.

Figure 1:
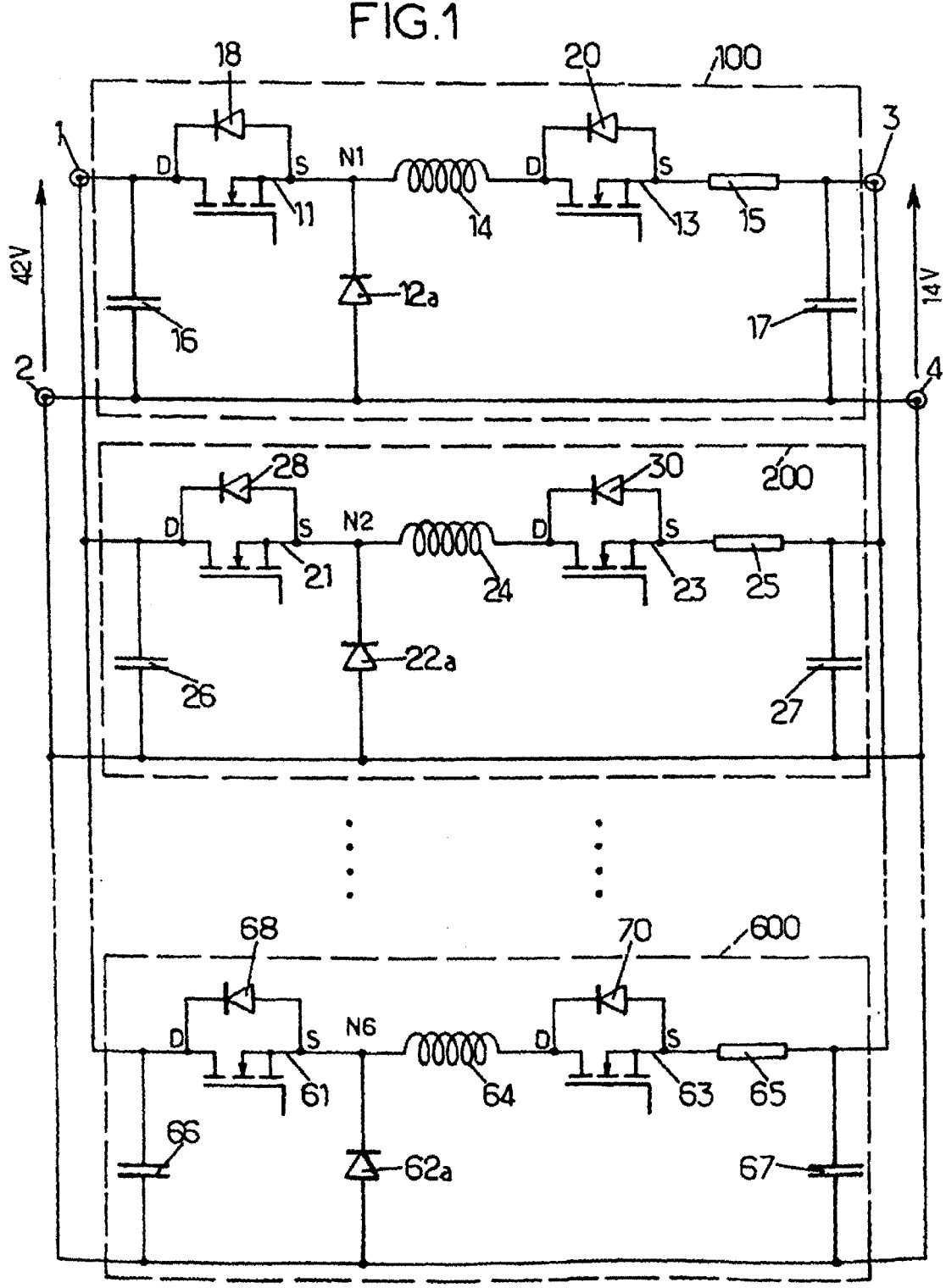
FIG. 1 is a circuit diagram of an embodiment of a voltage-lowering (buck) converter.

In the diagram of FIG. 1, a high-voltage DC network is connected to a buck converter via the positive terminal 1 and the negative terminal 2. The voltage between the terminals 1 and 2 is situated around 42 volts (V), for example. A DC network of low-voltage is connected to terminals 3 and 4, the terminal 3 being positive and the terminal 4 being negative, and the voltage between these two terminals is situated, for example, around 14 V.

In the example shown in FIG. 1, six mutually identical individual chopper converters 100, 200, ..., 600, of the buck type are disposed in parallel between on one side the terminals 1 and 2 and on the other side the terminals 3 and 4. The terminals 2 and 4 are directly interconnected.

In each of these individual converters 100, 200, ..., 600, a capacitor 16, 26, ..., 66, e.g. a 30 microfarad (.mu.F) capacitor, interconnects the terminals 1 and 2 in order to store on the 42 V network side the electric charge that is transferred by the individual converter 100, 200, ..., 600. Similarly, in each individual converter 100, 200, ..., 600, another capacitor 17, 27, ..., 57, e.g. likewise a 30 .mu.f capacitor, interconnects the terminals 3 and 4 in order to store, on the 14 V network side, the electric charge transferred by the individual converter 100, 200, ..., 600. In operation, each of the two networks respectively at 42 V and at 14 V, consumes some of the electric charge in the respective sets of capacitors 16, 26, ..., 66 and 17, 27, ..., 67.

In each individual converter 100, 200, ..., 600, the terminals 1 and 3 are interconnected by a branch containing the following components connected in series in the following order going from terminal 1 to terminal 3:

a buck transistor 11, 21, ..., 61, e.g. a MOS field effect transistor (MOS-FET) having an n channel (N-MOS), connected by its drain to the terminal 1. Such a transistor includes an intrinsic diode 18, 28, ..., 68 connected in parallel with the switch constituted by the buck transistor 11, 21, ..., 61 and oriented to pass current from the terminal 3 towards the terminal 1;

an inductor 14, 24, ..., 64, e.g. a 12 microhenry (μH) inductor with a resistance of 6 milliohms (mΩ) connected to the source of the buck transistor 11, 21, ..., 61 via a node N1, N2, ..., N6;

a protection transistor 13, 23, ..., 63, there being a single protection transistor for each cell, e.g. likewise an n-channel MOS-FET. This transistor 13, 23, ..., 63 is connected via its drain to the inductor 14, 24, ..., 64. As for the buck transistor 11, 21, ..., 61, this protection transistor 13, 23, ..., 63 includes an intrinsic diode 20, 30, ..., 70 connected in parallel with the protection transistor 13, 23, ..., 63 and oriented to pass current from the terminal 3 towards the terminal 1; and a resistor 15, 25, ..., 65, e.g. a 2 mΩ, connected to the source of the transistor 13, 23, ..., 63 and to the terminal 3.

In the event of an accidental short circuit between the source and the drain of the buck transistor 11, 21, ..., 61, the equivalent diode 20, 30, ..., 70 of the protection transistor 13, 23, ..., 63 prevents unwanted current flow from the terminal 1 to the terminal 3 so long as the protection transistor 13, 23, ..., 63 is controlled at that time to be OFF. Such an involuntary current would lead to the high-voltage circuit discharging into the low-voltage circuit.

Each individual buck converter 100, 200, ..., 600 also includes a diode 12a, 22a, ..., 62a having its cathode connected to the node N1, N2, ..., N6 and its anode connected to the terminals 2 and 4.

Each of the individual buck converters 100, 200, ..., 600 as constituted in this way is capable of transferring approximately 250 watts (W) of power from the 42 V network to the 14 V network.

Figure 2:
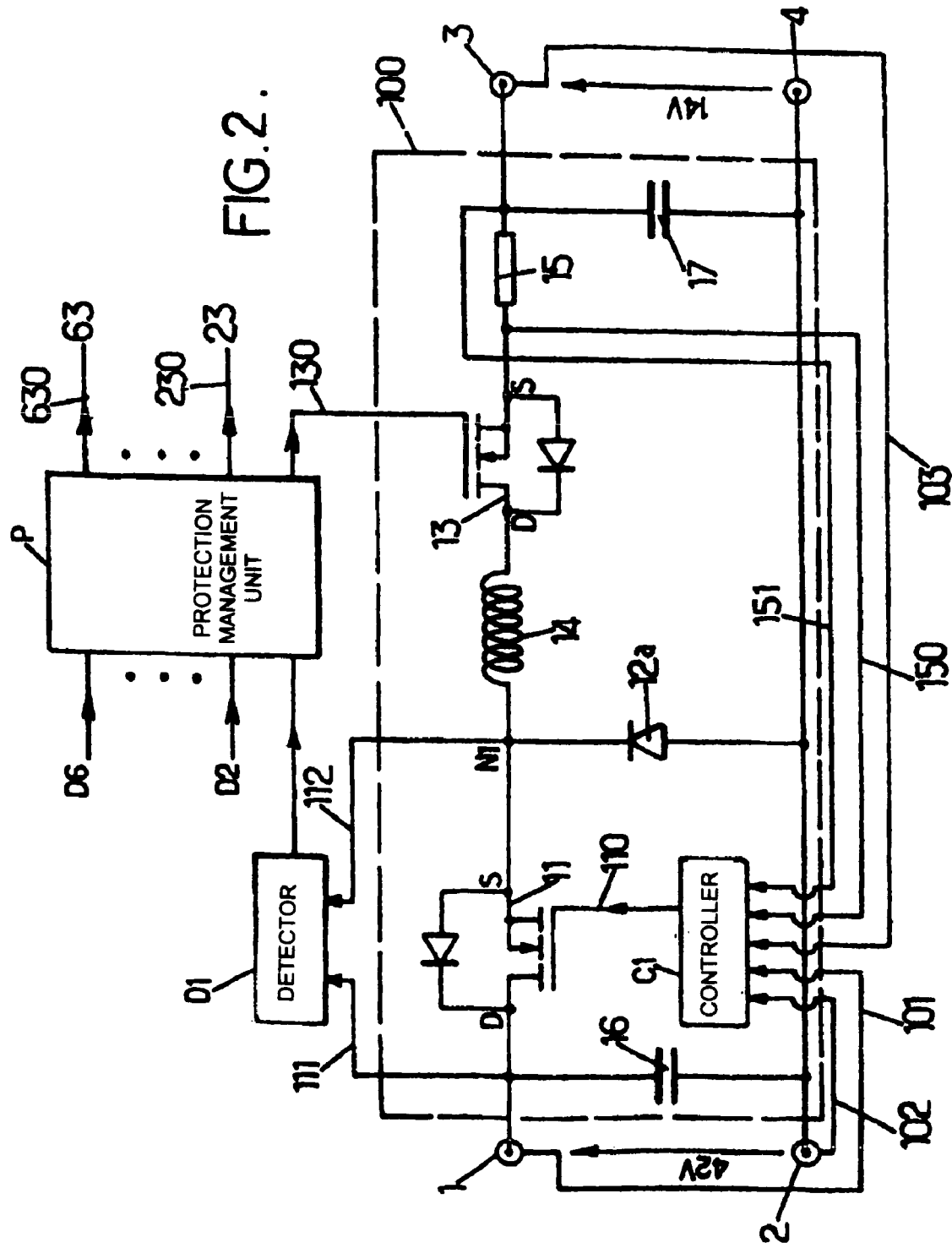
FIG. 2 shows the arrangement of a controller and a malfunction detector associated with the FIG. 1 converter.

FIG. 2 shows the architecture for controlling the individual converter 100 of FIG. 1. It comprises a controller C1 whose inputs receive the high voltage by wires 101 and 102 connected respectively to the terminals 1 and 2, said low voltage by wire 103 connected to the terminal 3, and the voltage across the terminals of the resistor 15 by wires 150 and 151. In a control mode using pulse width modulation and known to the person skilled in the art, the controller C1 controls the buck transistor 11 by OFF or ON signals transmitted to its grid by wire 110, with pulses being at a determined periodicity, e.g. corresponding to a frequency of 70 kilohertz (kHz).

A controller analogous to the controller C1 is connected in the same manner in each of the five other individual converters 200, ..., 600 to perform an identical function in each of those circuits. Advantageously, the six controllers issue respective pulses at the same pulse periodicity, and are taken into consideration in a determined cyclical order, so that pulses from two successive individual converters in the order are offset by a shift equal to one-sixth of the period of the control pulses from each individual converter.

For the individual converter 100, a detector D1 has two inputs receiving the voltage between the drain and the source of the buck transistor 11 via, two wires 111 and 112. In normal operation of the individual converter 100, the detector D1 transmits a signal to a protection management unit P so that it applies a certain voltage via wire 130 to the grid of the protection transistor 13, e.g. a voltage lying in the range 5 V to 10 V relative to the source of the protection transistor 13, so as to hold the protection transistor 13 in an ON or conductive state.

When the detector D1 identifies a malfunction of the buck transistor 11, an(d in particular a short circuit between the drain and the source of the buck transistor 11, the detector D1 interrupts the voltage applied to the grid of the protection transistor 13 via the wire 130 so as to open (switch OFF) the circuit between, the drain and the source of the protection transistor 13. This circuit opening can be obtained by means of a bias resistor (not shown and having a resistance of 10 kilohms (kΩ)) connecting together the grid and the source of the protection transistor 13. Thus, the entire individual converter 100 is taken out of service. In addition, any current discharged from the 42 V network to the 14 V network via the individual converter 104 cannot flow from the terminal 1 to the terminal 3.

The other individual converters 200, ..., 600 also have respective detectors D2, ..., D6 identical to the detector D1 and connected in analogous manner to the protection management unit P. This unit is also connected by wires 230, ..., 630 to the respective buck transistors 23, ..., 63 of the individual converters 200, ..., 600 so as to provide an identical individual protection mechanism to all of the individual converters 100, 200, ..., 600.

Since each individual converter 100, 200, ..., 600 is connected in parallel with all the other individual converters, any one of them ceasing to operate does not interrupt the operation of the others. Overall converter operation thus continues by means of the individual converters that are still operational. This continued operation is made possible by the individual converters being connected in parallel, and by a protection switch being placed in each individual converter.

Optionally, the control mode for all of the individual converters 100, 200, ..., 600 via their respective controllers can be adapted by means of a supervisor controller. (not shown) connected to the six controllers and to the six detectors so as to take account of one of the individual converters being taken out of service. Under such circumstances, this makes it possible to optimize the operation of the overall converter in spite of one of its individual converters being taken out of service.

For example, when one of the individual converters 100, 200, ..., 600 is taken out of service, the supervisor controller controls the controllers of the five other individual converters 100, 200, ..., 600 that are still operational so that the control pulses of two successive individual converters are offset by a period equal to one-fifth of the common period of the control pulses in each individual converter. The fault mode of operation as obtained in this way for the overall converter, after one of the individual converters has been taken out of service, corresponds to a reduction in the maximum rate at which electric charge can be transferred, or to a reduction in the maximum electrical power that can be transferred between the high-voltage network and the low-voltage network.

Figure 3:
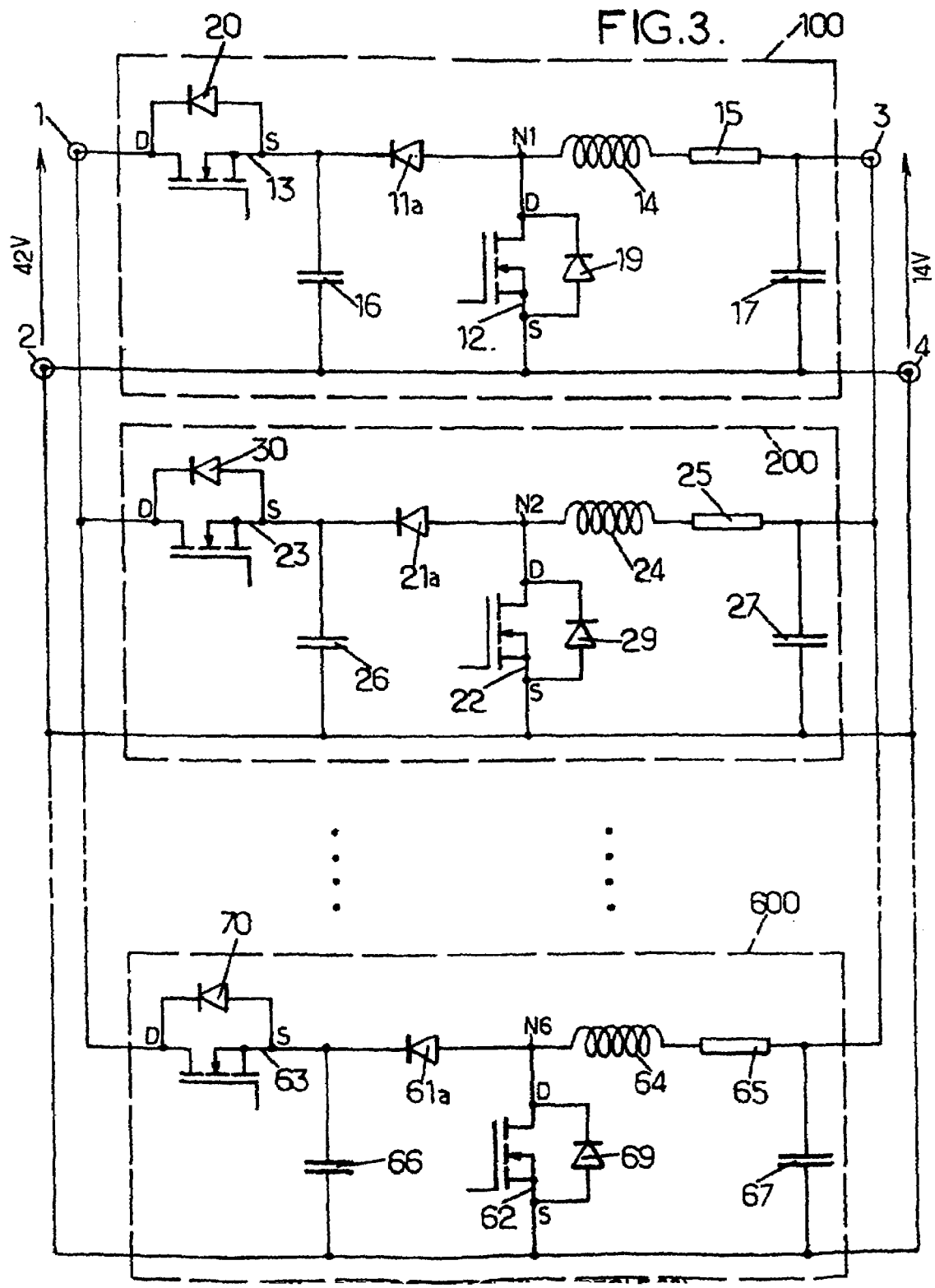
FIG. 3 is a circuit diagram of an embodiment of a voltage-raising (boost) converter.

FIG. 3 corresponds to an embodiment which consists in a boost converter. This embodiment repeats the architecture and some of the components of the embodiment described above. A detailed description is not repeated in full, and all components and references that are not repeated are identical to those described in the above embodiment.

In this embodiment, the single protection transistor 12, 23, ..., 63 is connected in the high-voltage portion of the cell.

Each individual converter 100, 200, ..., 600 is now a boost converter comprising:

a transistor 13, 23, ..., 63, e.g. an n-channel MOS-FET, performing the function of a protection switch, having its drain connected to the terminal 1. It includes an intrinsic diode 20, 30, ..., 70 connected in parallel with the protection transistor 13, 23, ..., 63 and oriented to pass current flowing towards the terminal 1. Its source is also connected to the capacitor 16, 26, ..., 66;

a diode 11a, 21a, ..., 61a having its cathode connected to the source of the protection transistor 13, 23, ..., 63;

an inductor 14, 24, ..., 64, e.g. a 12 µH and 6 mΩ inductor, connected to the anode of the diode 11a, 21a, ..., 61a via a node N1, N2, ..., N6; and a resistor 15, 25, ..., 65, e.g. a 2 mΩ resistor connected to the inductor 14, 24, ..., 64 and to the terminal 3.

Instead of the diodes 12a, 22a, ..., 62a, each individual converter 100, 200, ..., 600 includes a boost transistor 12, 22, ..., 62. The boost transistor 12, 22, ..., 62, e.g. still an n-channel MOS-FET, has its drain connected to the node N1, N2, ..., N6 and its source connected to the terminals 2 and 4. The boost transistor 12, 22, ..., 62 also includes an intrinsic diode 19, 29, ..., 69 connected in parallel and oriented to pass current towards the node N1, N2, ..., N6.

The mode of operation of such a boost converter is known to the person skilled in the art and makes use of a mode of controlling the boost transistors 12, 22, ..., 62 analogous to that used in the above embodiment for the buck transistors. Each of the individual boost converters 100, 200, ..., 600 constituted in this way can transfer approximately 250 W of power from the 14 V network to the 42 V network.

Advantageously, for a boost converter corresponding to FIG. 3, respective malfunction detectors D1, D2, ..., D6 are connected via two inputs to the drain and the source of the boost transistor 12, 22, ..., 62 of the individual converter with which it is associated. These malfunction detectors D1, D2, ..., D6 contribute in the same manner as described above to switching OFF the protection transistor 13, 23, ..., 63 of the individual converter in which a malfunction is detected.

The same advantages and improvements as those mentioned for a buck converter can be reproduced identically in the present case of a boost converter.

Figure 4:
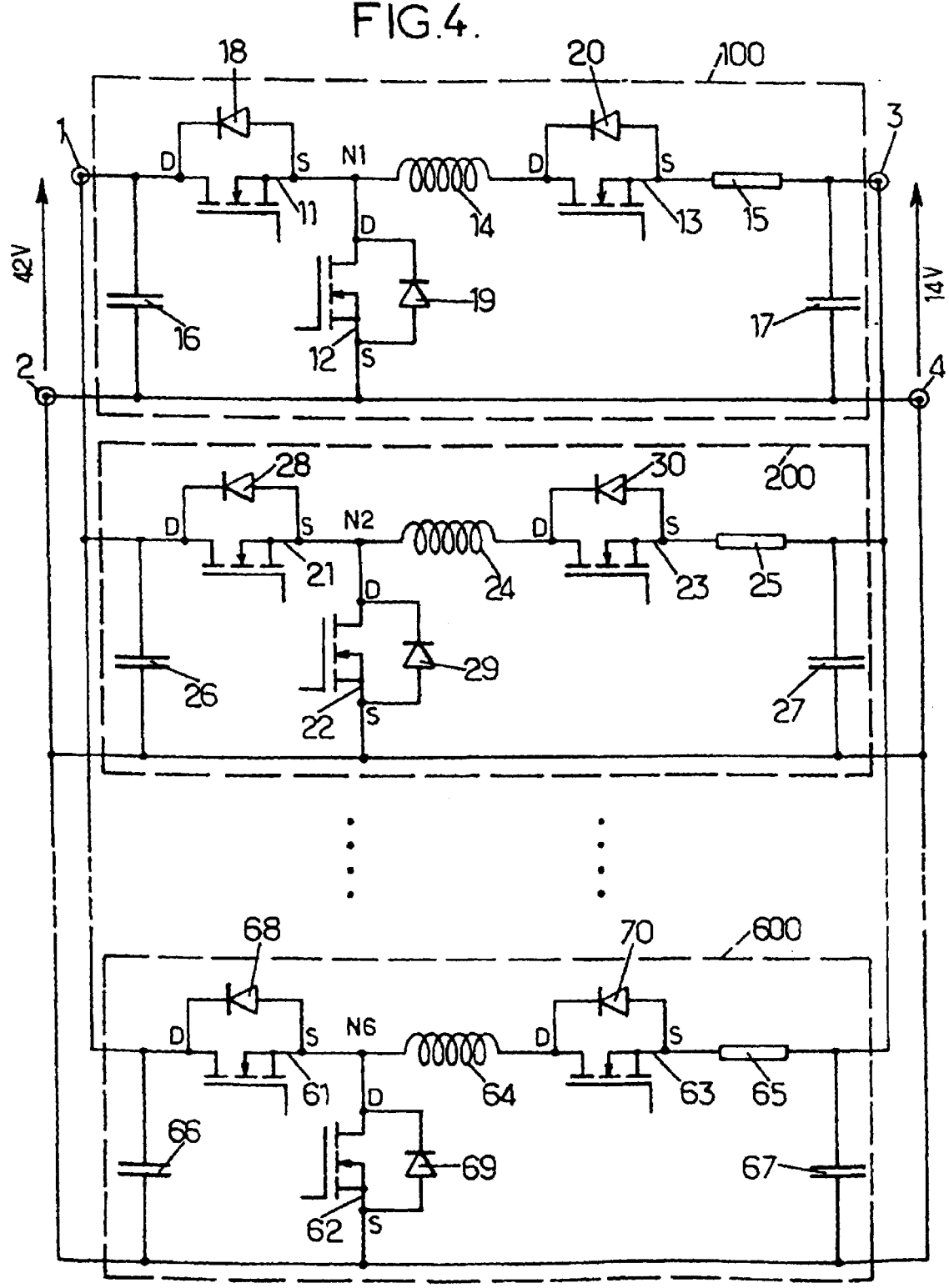
FIG. 4 is a circuit diagram of a first embodiment of a buck/boost converter.

FIG. 4 corresponds to a converter made up of reversible individual converters 100, 200, ..., 600. Each of the reversible individual converters 100, 200, ..., 600 uses the same components as the buck or boost chopper converters described above, and they are disposed in analogous manner. A detailed description of these components is not repeated below.

Each reversible individual converter 100, 200, ..., 600 comprises a buck transistor 11, 21, ..., 61 and a boost transistor 12, 222, ..., 62 taking the places respectively of the diodes 11a, 21a, ..., 61a and 12a, 22a, ..., 62a.

The buck transistor 11, 21, ..., 61, e.g. an n-channel MOS-FET has its drain connected to the terminal 1 and its source connected to the node N1, N2, ..., N6. Its intrinsic diode 18, 28, ..., 68 connected in parallel with the buck transistor 11, 21, ..., 61 is oriented to pass current from the terminal 3 to the terminal 1.

The boost transistor 12, 22, ..., 62, e.g. another n-channel MOS-FET, has its drain connected to the node N1, N2, ..., N6 and its source to the terminals 2 and 4. Its intrinsic diode 19, 29, ..., 69 connected in parallel therewith is oriented to pass current towards the node N1, N2, ..., N6.

Figure 5:
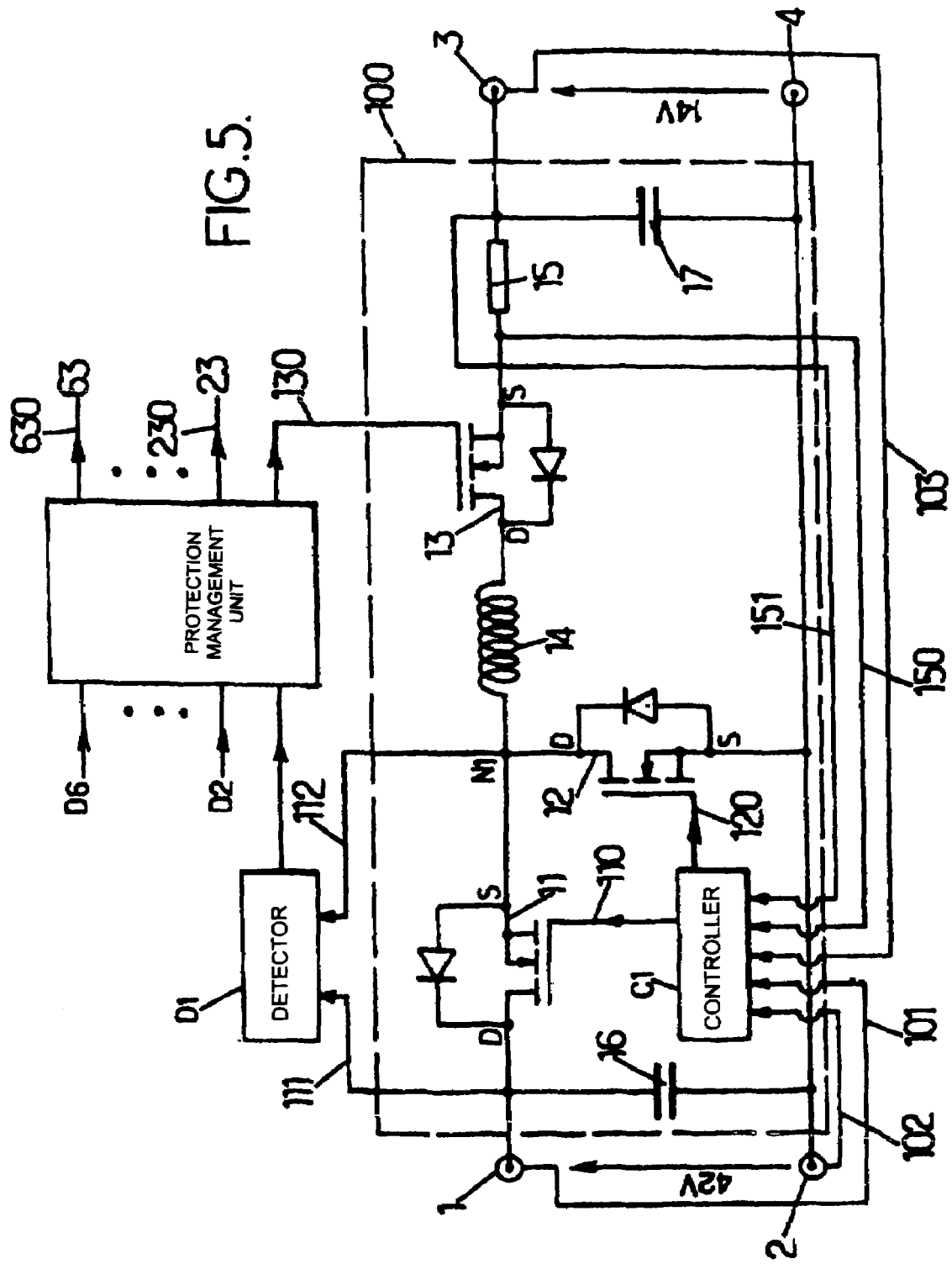
FIG. 5 shows the arrangement of a controller and a malfunction detector associated with the FIG. 4 converter.

As shown in FIG. 5, for the reversible individual converter 100, its controller C1 possesses two outputs 110 and 120 connected respectively to the grid of the buck transistor 11, 21, ..., 61 and to the grid of the boost transistor 12, 22, ..., 62 of the individual converter 100. It also possesses two inputs connected by the wires 150 and 151 to the two terminals of the low-resistance resistor 15.

In a control mode known to the person skilled in the art, the controller C1, when operating in a buck operating mode, controls the voltage at the grid of the buck transistor 11, 21, ..., 61 to switch it OFF and ON in alternation as a function of the value of the current measured flowing through the low-resistance resistor 15. Simultaneously, it controls the grid of the boost transistor 12, 22, ..., 62 so that it is OFF, at least during time intervals when the buck transistor 11, 21, ..., 61 is ON.

Symmetrically, in a boost mode of operation, the controller C1 controls the grid of the boost transistor 12, 22, ..., 62 to switch it OFF and ON in alternation as a function of the value of the current measured flowing through the low-resistance resistor 15. It then simultaneously controls the grid of the buck transistor 11, 21, ..., 61 so that it is OFF, at least during those time intervals during which the boost transistor 12, 22, ..., 62 is ON.

Similarly, each reversible individual converter 100, 200, ..., 600 includes a system for controlling its buck and boost transistors 11, 21, ..., 61 and 12, 22, ..., 62 identical with that of reversible individual converter 100. The control signals of all of the reversible individual converters are synchronized in identical manner to the buck or boost converters described above for the above embodiment.

In FIG. 4, the protection transistor 13, 23, ..., 63 of each reversible individual converter 100, 200, ..., 600 is placed between the inductor 14, 24, ..., 64 and the low-resistance resistor 15, 25, ..., 65, its drain being connected to the inductor, its source to the resistor, and its intrinsic diode 20 being oriented to pass current from the terminal 3 towards the terminal 1. These protection transistors 13, 23, ..., 63 connected in this way are controlled by the protection management unit P (see FIG. 5) itself associated with the malfunction detectors D1, D2, ..., D6. These detectors D1, D2, ..., D6 are respectively connected to the source and to the drain of the buck transistor 11, 21, ..., 61 in each individual converter 100, 200, ..., 600. The protection obtained is then identical to that of the first embodiment, corresponding to FIGS. 1 and 2.

The same advantages and improvements as those mentioned for a buck converter can be obtained in the present case of a reversible converter.

Figure 6:
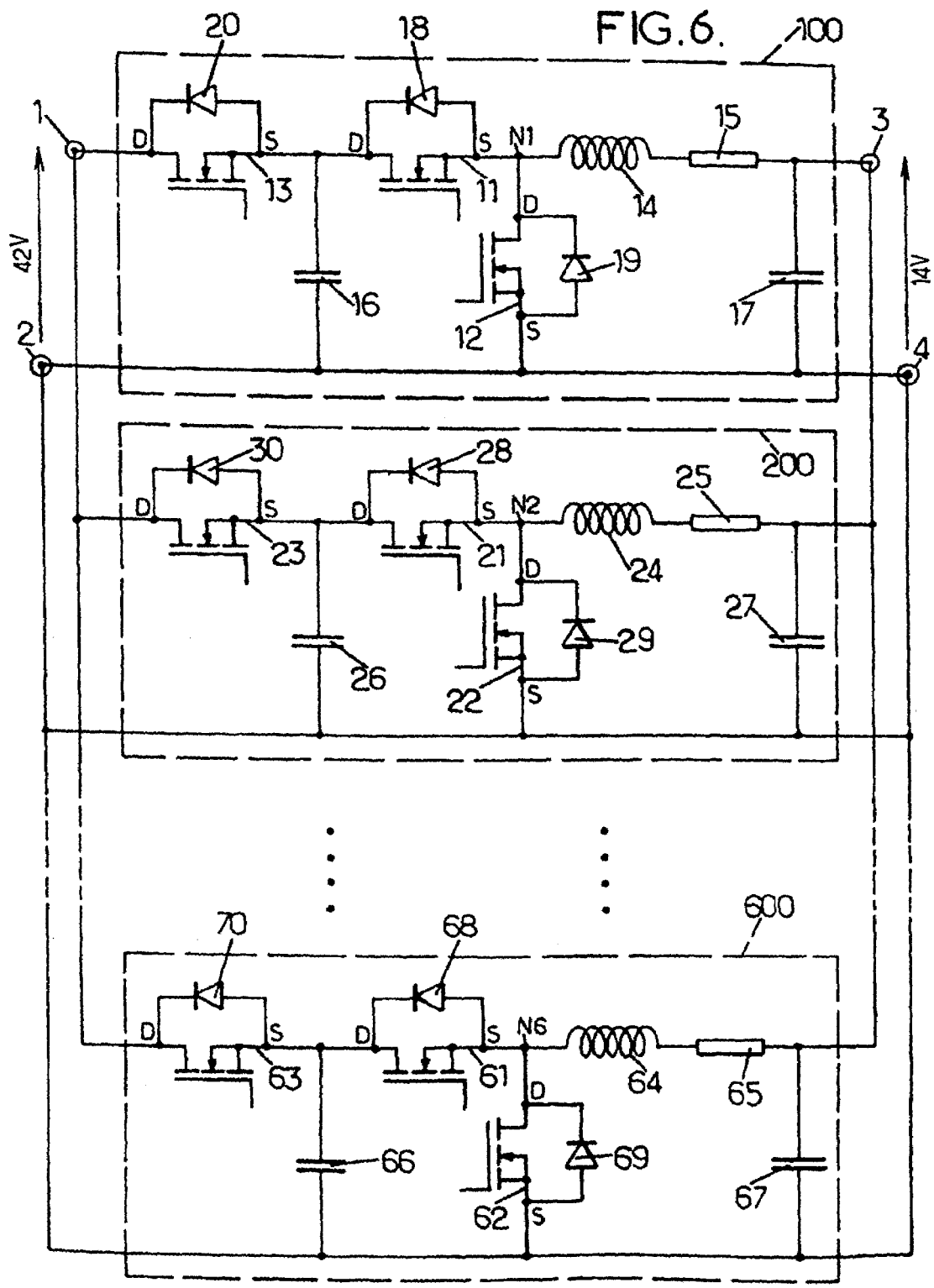
FIG. 6 is a circuit diagram of a second embodiment of a buck/boost converter.
Figure 7:
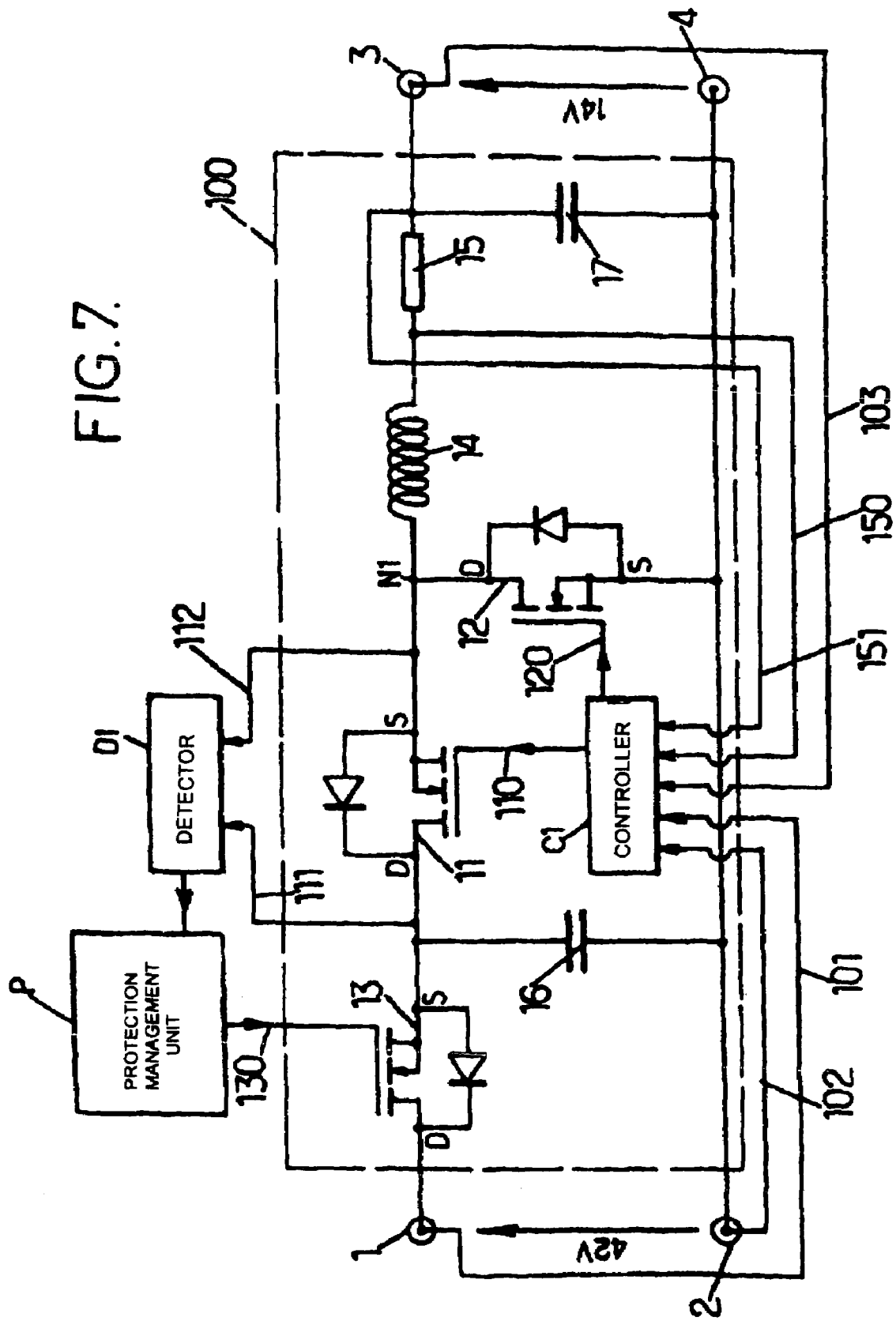
FIG. 7 shows the arrangement of a controller and a malfunction detector associated with the FIG. 6 converter.

FIGS. 6 and 7 taken together correspond to a reversible converter of structure identical to that of the reversible converter shown in FIGS. 4 and 5. In this new embodiment, the protection transistor 13, 23, ..., 63 of each reversible individual converter 100, 200, ..., 600 is disposed between the terminal 1 and the buck transistor 11, 21, ..., 61. Its drain is connected to the terminal 1 and its source to a node between the drain of the buck transistor 11, 21, ..., 61 and the converter 16, 26, ..., 66. The intrinsic diode 20, 30, ..., 70 of the protection transistor 13, 23, ..., 63 is still oriented to pass current towards the terminal 1.

This position for the protection transistor 13, 23, ..., 63 is preferred to a position situated between the buck transistor 11, 21, ..., 61 and a node connecting the capacitor 16, 26, ..., 66 to the terminal 1. The current flowing in the loop formed by the capacitor 16, 26, ..., 66, the buck transistor 11, 21, ..., 61, and the boost transistor 12, 22, ..., 62 is a chopped current that is subject to sudden changes, so it is particularly advantageous to reduce the physical size of this loop in order to reduce disturbances due to any parasitic self-inductance in the loop, or indeed due to any radiation transmitted from the loop.

The detector D1 still receives on its two inputs the voltage between the drain and the source of the buck transistor 11 via the two wires 111 and 112. An identical disposition is used for these components in each of the reversible individual converters 100, 200, ..., 600.

The operation of the overall reversible converter in this embodiment, and the operation of its protection system, are identical to the corresponding operations for FIGS. 4 and 5. Similarly, the detector associated with each buck transistor 11, 21, ..., 61 enables the individual converter 100, 200, ..., 600 with which it is associated to be taken out of service in the event of a short circuit occurring in said buck transistor. The same improvements can likewise be combined in this embodiment.

Figure 8:
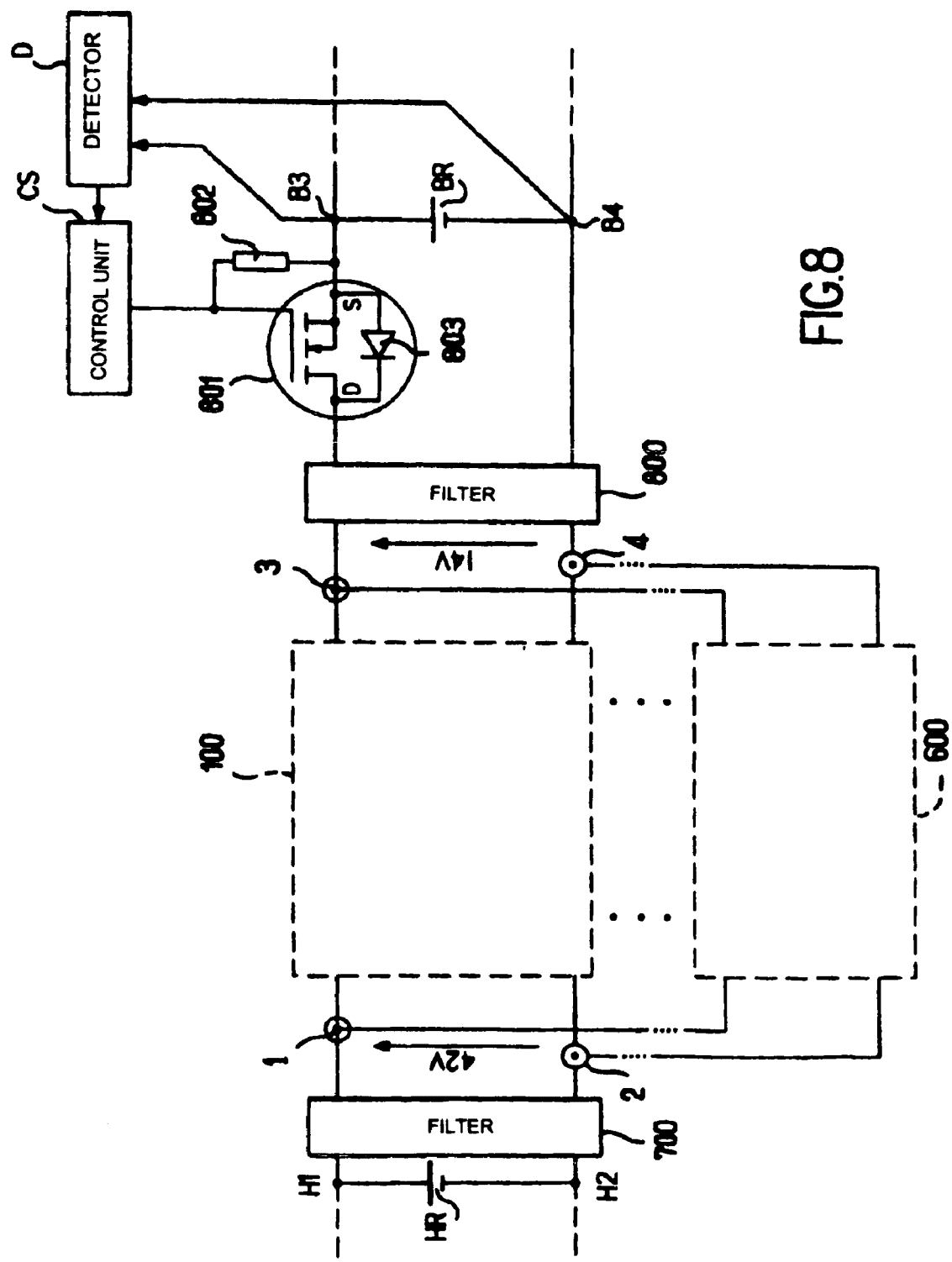
FIG. 8 is a circuit diagram of a circuit including common protection on the low-voltage side.

FIG. 8 shows a circuit which is further equipped with a protection transistor that is common to all of the cells, on the low-voltage side.

In this figure, the cells 100, ..., 600 are represented by dashed-line boxes only, the individual structure of the cells being any of the structure described above, with each cell incorporating a single protection transistor on its high voltage side.

In the FIG. 8 circuit, a high voltage DC network, e.g. operating at about 42 V between terminals H1 and H2, includes a battery HR connected between these terminals. H1 is a positive terminal and H2 is a negative terminal.

A low-voltage DC network, e.g. operating at about 14 V between two terminals B3 and B4 of this network B, includes a battery BR. The battery BR is connected between the terminals B3 and B4. B3 is a positive terminal and B4 is a negative terminal.

The low-voltage network is connected via a filter 800 to the cells 100, ..., 600. The filter 800 is connected to the terminals 3 and 4 that are common to the cells 100, ..., 600. The structure of the filter 800 is known to the person skilled in the art and is not described in detail herein.

Furthermore, the high-voltage network is also connected to the cells via another filter 700 connected to the terminals 1 and 2 and to the terminals H1, H2 of the high-voltage network having the high-voltage battery HR connected between them.

A protection transistor 801, still an n-channel (N-MOS) metal-oxide semiconductor field-effect transistor (MOS-FET) is connected between the filter 800 and the terminal B3. The dragon of this protection transistor 801 is connected to the filter 800, while its source is connected to the terminal B3.

A control unit CS has an output connected to the grid of the protection transistor 801 and an input connected to an output of a detector D. The detector D is also connected to the terminals B3 and B4.

In a normal mode of operation, the detector D detects a voltage of about 14 V between the terminals B3 and B4. The control unit CS then causes the safety transistor 801 to be switched ON by applying to its grid a positive voltage of about 5 V to 10 V relative to its source, for example.

When the detector D detects abnormal values for the voltages B3 and B4, e.g. a polarity reversal, the control circuit CS interrupts the positive voltage applied to the grid of the protection transistor 801. A resistor 802, e.g. a 10 kΩ resistor connected between the grid and the source of the protection transistor 801 then ensures that this transistor switches OFF. Thus, in the event of a short circuit or a polarity reversal between the terminals B3 and B4 of the low voltage circuit B, the low-voltage circuit and the converter are isolated from each other.

When the protection transistor 801 is an n-channel MOS-FET, it possesses an external intrinsic diode 803 connected in parallel between the drain and the source of the transistor. This intrinsic diode 803 passes current from the source towards the drain of the transistor 801, with a threshold voltage of the order of 0.9 V to 1.3 V. The protection transistor 801 is oriented so that the intrinsic diode 803 passes current towards the filter 800.

Naturally, the invention is not limited to the embodiment described and variants can be applied thereto without going beyond the ambit of the invention as defined by the claims.

In particular, although the invention is described above for a preferred embodiment consisting in placing the single protection Transistor of each cell on the high-voltage side and the common switch on the low-voltage side, thus enabling a cell to be isolated and also protecting the converter against a polarity reversal on the low-voltage side while minimizing static consumption, it is possible to place the protection transistors in each of the cells on the low-voltage side and the common switch on the high-voltage side. At the cost of a small increase in static consumption, that makes it possible to avoid transferring charge from the low-voltage battery to the high-voltage battery when the high-voltage battery is discharged.

In embodiments that are alternatives to the embodiments described, the N-MOS type transistors may be replaced by corresponding transistors of P-MOS type. They may also be replaced by transistors using bipolar technology, without that changing the function and general operation of the circuit. The protection transistor which is common to all of the cells may also be replaced by a switch that is controlled by an electromagnetic relay.

In addition, although the protection transistor 801 common to the various cells on the low-voltage side is shown as being integrated in the converter, it may be located remotely therefrom.

Conversely, although the control unit CS for the transistor 801 is shown as being separate from the protection management unit P, it could be incorporated therein.

What is claimed is:

1. A DC/DC voltage converter comprising:
   a first positive terminal and a first negative terminal for connection respectively to two terminals of a high-voltage electrical network;
   a second positive terminal and a second negative terminal for connection respectively to two terminals of a low-voltage electrical network; and
   n cells connected in parallel, where n is an integer greater than unity, disposed between said first positive and negative terminals and between said second positive and negative terminals, each cell comprising a chopper DC/DC converter, each having a first circuit branch interconnecting said first and second negative terminals, a second circuit branch including an inductor and interconnecting said first and second positive terminals, at least one chopper switch, and a first management unit adapted to control switching of the chopper switch with a determined duty ratio;
   wherein each cell further comprises a single protection transistor disposed in said second circuit branch and associated with a protection management unit for taking said cell out of service independently of the other cells;
   wherein the protection transistor of each cell is a MOS transistor connected in series in said second circuit branch of the cell between the inductor and said second positive terminal, and including an intrinsic diode having its cathode connected to the inductor and its anode connected to said second positive terminal.

2. A converter according to claim 1, wherein the single protection transistor in each cell is connected in a high-voltage portion of the cell.

3. A converter according to claim 2, wherein the MOS transistor connected in series in said second circuit branch so as to be immediately adjacent to said first positive terminal, and having the intrinsic diode connected to said first positive terminal by its cathode.

* * * * *